(12) United States Patent
Davis, Jr. et al.

(10) Patent No.: US 10,049,365 B2
(45) Date of Patent: Aug. 14, 2018

(54) EQUIPMENT MANAGEMENT SYSTEM

(71) Applicant: Prova Group, Inc., Dallas, TX (US)

(72) Inventors: Tommy Lee Davis, Jr., Florrisant, MO (US); David Earl Doser, Jr., Fenton, MO (US)

(73) Assignee: PROVA GROUP, INC., Dallas, TX (US)

( * ) Notice: Subject to any disclaimer, the term of this patent is extended or adjusted under 35 U.S.C. 154(b) by 0 days.

(21) Appl. No.: 13/758,933

(22) Filed: Feb. 4, 2013

(65) Prior Publication Data

US 2013/0147607 A1 Jun. 13, 2013

Related U.S. Application Data

(63) Continuation of application No. 12/950,585, filed on Nov. 19, 2010, now Pat. No. 8,370,225, which is a
(Continued)

(51) Int. Cl.
| | |
|---|---|
| *G06K 17/00* | (2006.01) |
| *G06Q 30/00* | (2012.01) |
| *G06F 17/30* | (2006.01) |
| *G06Q 10/08* | (2012.01) |
| *G06Q 20/32* | (2012.01) |
| *G06Q 30/06* | (2012.01) |

(52) U.S. Cl.
CPC ..... *G06Q 30/012* (2013.01); *G06F 17/30289* (2013.01); *G06F 17/30312* (2013.01); *G06F 17/30424* (2013.01); *G06F 17/30598* (2013.01); *G06Q 10/087* (2013.01); *G06Q 10/0875* (2013.01); *G06Q 20/3276* (2013.01); *G06Q 30/0609* (2013.01); *G06K 2017/0051* (2013.01)

(58) Field of Classification Search
CPC ................. G06K 7/0008; G06Q 10/087

USPC ............... 340/10.4, 10.5, 10.3, 572.1, 572.4
See application file for complete search history.

(56) References Cited

U.S. PATENT DOCUMENTS

| | | |
|---|---|---|
| 2,292,387 A | 8/1942 | Markey et al. |
| 4,277,837 A | 7/1981 | Stuckert |

(Continued)

FOREIGN PATENT DOCUMENTS

| | | |
|---|---|---|
| WO | 199855970 | 10/1998 |
| WO | 200188884 | 11/2000 |

(Continued)

OTHER PUBLICATIONS

2 Groups With the Same Reid/Holography Licence Tags Idea, Holography News, Dec. 2002.

(Continued)

*Primary Examiner* — Vernal Brown
(74) *Attorney, Agent, or Firm* — Jackson Walker LLP; Christopher J. Rourk; Thomas B. Hayes

(57) ABSTRACT

A system and method of managing equipment is disclosed. The system incorporates a tagging device to attach identification tags to each piece of equipment. A scanning device is used to read the identification tags and relay this information to an equipment server. An input device is used to input information to the equipment server. The equipment server runs the equipment management program. The system flags a potential asset assigned to an asset creating individual. Equipment is designated an asset after use in an asset creating event.

20 Claims, 4 Drawing Sheets

Related U.S. Application Data continuation of application No. 11/086,943, filed on Mar. 22, 2005, now Pat. No. 7,840,453, which is a continuation of application No. 10/038,292, filed on Jan. 4, 2002, now abandoned.

(56) References Cited

U.S. PATENT DOCUMENTS

| | | |
|---|---|---|
| 4,386,266 A | 5/1983 | Chesarek |
| 4,529,870 A | 7/1985 | Chaum |
| 4,636,950 A | 1/1987 | Caswell et al. |
| 4,686,515 A | 8/1987 | Anderson et al. |
| 4,688,026 A | 8/1987 | Scribner et al. |
| 4,689,478 A | 8/1987 | Hale et al. |
| 4,816,824 A | 3/1989 | Katz et al. |
| 4,857,716 A | 8/1989 | Gombrich et al. |
| 5,050,031 A | 9/1991 | Weiley |
| 5,267,315 A | 11/1993 | Narita et al. |
| 5,267,756 A | 12/1993 | Molee et al. |
| 5,276,311 A | 1/1994 | Hennige |
| 5,288,980 A | 2/1994 | Patel et al. |
| 5,306,049 A | 4/1994 | Schireck |
| 5,319,544 A | 6/1994 | Schmerer et al. |
| 5,361,134 A | 11/1994 | Hu et al. |
| 5,380,047 A | 1/1995 | Molee et al. |
| 5,436,970 A | 7/1995 | Ray et al. |
| 5,521,984 A | 5/1996 | Denenberg et al. |
| 5,548,110 A | 8/1996 | Storch et al. |
| 5,578,808 A | 11/1996 | Taylor |
| 5,585,787 A | 12/1996 | Wallerstein |
| 5,595,356 A | 1/1997 | Kewin |
| 5,604,802 A | 2/1997 | Holloway |
| 5,635,693 A | 6/1997 | Benson et al. |
| 5,640,002 A | 6/1997 | Ruppert et al. |
| 5,642,419 A | 6/1997 | Rosen |
| 5,673,338 A | 9/1997 | Denenberg et al. |
| 5,689,561 A | 11/1997 | Pace |
| 5,732,401 A | 3/1998 | Conway |
| 5,737,886 A | 4/1998 | Kruckemeyer |
| 5,770,843 A | 6/1998 | Rose et al. |
| 5,774,876 A | 6/1998 | Woolley et al. |
| 5,777,884 A | 7/1998 | Belka et al. |
| 5,794,213 A | 8/1998 | Markman |
| 5,796,351 A | 8/1998 | Yabuki |
| 5,825,299 A | 10/1998 | Fuentes et al. |
| 5,825,302 A | 10/1998 | Stafford |
| 5,870,733 A | 2/1999 | Bass et al. |
| 5,878,416 A | 3/1999 | Harris et al. |
| 5,895,073 A | 4/1999 | Moore |
| 5,930,770 A | 7/1999 | Edgar |
| 5,963,133 A | 10/1999 | Monjo |
| 5,963,134 A | 10/1999 | Bowers et al. ............. 340/572.1 |
| 5,963,919 A | 10/1999 | Brinkley et al. |
| 5,971,435 A | 10/1999 | DiCesare et al. |
| 6,002,344 A | 12/1999 | Bandy et al. |
| 6,026,378 A | 2/2000 | Onozaki |
| 6,030,001 A | 2/2000 | Kruckemeyer |
| 6,061,656 A | 5/2000 | Pace |
| 6,070,141 A | 5/2000 | Houvener et al. |
| 6,076,064 A | 6/2000 | Rose, Jr. |
| 6,112,984 A | 9/2000 | Snavely |
| 6,131,811 A | 10/2000 | Gangi |
| 6,148,091 A | 11/2000 | DiMaria |
| 6,149,055 A | 11/2000 | Gatto |
| 6,170,746 B1 | 1/2001 | Brook et al. |
| 6,195,006 B1 | 2/2001 | Bowers et al. |
| 6,203,069 B1 | 3/2001 | Outwater et al. |
| 6,224,109 B1 | 5/2001 | Yang |
| 6,226,619 B1 | 5/2001 | Halperin et al. |
| 6,232,876 B1 | 5/2001 | Maloney |
| 6,250,549 B1 | 6/2001 | DeFabio, Jr. |
| 6,265,977 B1 | 7/2001 | Vega et al. |
| 6,266,651 B1 | 7/2001 | Woolston |
| 6,270,011 B1 | 8/2001 | Gottfried |
| 6,286,762 B1* | 9/2001 | Reynolds et al. ....... 235/472.01 |
| 6,304,856 B1 | 10/2001 | Soga et al. |
| 6,305,603 B1 | 10/2001 | Grunbok et al. |
| 6,309,690 B1 | 10/2001 | Brogger et al. |
| 6,324,522 B2 | 11/2001 | Peterson et al. |
| 6,325,292 B1 | 12/2001 | Sehr |
| 6,330,971 B1 | 12/2001 | Mabry et al. |
| 6,338,053 B2 | 1/2002 | Uehara et al. |
| 6,346,885 B1 | 2/2002 | Curkendall ................ 340/572.4 |
| 6,357,662 B1 | 3/2002 | Helton et al. |
| 6,402,029 B1 | 6/2002 | Gangi |
| 6,415,978 B1 | 7/2002 | McAllister |
| 6,431,439 B1 | 8/2002 | Suer et al. |
| 6,480,108 B2 | 11/2002 | McDonald ................... 340/505 |
| 6,494,367 B1 | 12/2002 | Zacharias |
| 6,505,094 B2 | 1/2003 | Pape et al. |
| 6,557,758 B1 | 5/2003 | Monico |
| 6,559,620 B2 | 5/2003 | Zhou et al. ................... 320/101 |
| 6,591,252 B1 | 7/2003 | Young |
| 6,594,475 B1 | 7/2003 | Anvekar et al. ............ 455/277.1 |
| 6,676,017 B1 | 1/2004 | Smith, III |
| 6,686,881 B1 | 2/2004 | Lu et al. |
| 6,700,493 B1 | 3/2004 | Robinson ................... 340/573.1 |
| 6,707,381 B1 | 3/2004 | Maloney |
| 6,714,121 B1 | 3/2004 | Moore ......................... 340/10.3 |
| 6,735,324 B1 | 5/2004 | McKinley et al. ............ 382/100 |
| 6,750,765 B1 | 6/2004 | van Wijk ....................... 340/505 |
| 6,758,403 B1 | 7/2004 | Keys et al. |
| 6,763,996 B2 | 7/2004 | Rakers et al. |
| 6,774,811 B2* | 8/2004 | Kaufman et al. ............... 340/8.1 |
| 6,816,075 B2 | 11/2004 | Grunes et al. |
| 6,847,892 B2 | 1/2005 | Zhou et al. ................... 701/213 |
| 6,956,538 B2 | 10/2005 | Moore .......................... 343/878 |
| 7,005,968 B1* | 2/2006 | Bridgelall ................. 340/10.42 |
| 7,019,644 B2 | 3/2006 | Barrie ...................... 340/539.13 |
| 7,114,656 B1 | 10/2006 | Garver |
| 7,129,837 B2 | 10/2006 | Shannon et al. ......... 340/539.13 |
| 7,136,832 B2 | 11/2006 | Li et al. .......................... 705/34 |
| 7,156,312 B2 | 1/2007 | Becker et al. ................. 235/492 |
| 7,158,038 B2 | 1/2007 | Fujie ........................... 340/573.4 |
| 7,267,262 B1* | 9/2007 | Brown ............... G08B 13/2454 235/375 |
| 7,298,264 B1 | 11/2007 | Kuzma et al. ............. 340/572.1 |
| 8,234,185 B2 | 7/2012 | Davis, Jr. |
| 2001/0000019 A1 | 3/2001 | Bowers et al. |
| 2001/0014955 A1 | 8/2001 | Achiwa et al. |
| 2001/0018660 A1 | 8/2001 | Sehr |
| 2001/0034717 A1 | 10/2001 | Whitworth |
| 2001/0041214 A1 | 11/2001 | Brogger et al. |
| 2001/0042059 A1 | 11/2001 | Uehara et al. |
| 2001/0047340 A1 | 11/2001 | Snow et al. |
| 2001/0049606 A1 | 12/2001 | Lucarelli |
| 2001/0051905 A1 | 12/2001 | Lucas ............................ 705/29 |
| 2002/0005774 A1 | 1/2002 | Rudolph et al. ............. 340/5.61 |
| 2002/0029342 A1 | 3/2002 | Keech |
| 2002/0049507 A1 | 4/2002 | Hameen-Anttila |
| 2002/0049656 A1 | 4/2002 | Lancos et al. |
| 2002/0052193 A1 | 5/2002 | Chetty |
| 2002/0059147 A1 | 5/2002 | Ogasawara |
| 2002/0073044 A1 | 6/2002 | Singhal |
| 2002/0077956 A1 | 6/2002 | Solhelm |
| 2002/0107610 A1 | 8/2002 | Kaehler et al. |
| 2002/0111819 A1 | 8/2002 | Li et al. ............................ 705/1 |
| 2002/0123955 A1 | 9/2002 | Andreski |
| 2002/0143635 A1 | 10/2002 | Goodwin |
| 2002/0158751 A1 | 10/2002 | Bormaster |
| 2002/0161666 A1 | 10/2002 | Fraki et al. |
| 2002/0165817 A1 | 11/2002 | Rackson et al. |
| 2002/0188702 A1 | 12/2002 | Short et al. ................... 709/220 |
| 2002/0190862 A1 | 12/2002 | Berquist et al. |
| 2003/0007464 A1 | 1/2003 | Balani |
| 2003/0034390 A1 | 2/2003 | Linton et al. ................. 235/382 |
| 2003/0069648 A1 | 4/2003 | Douglas et al. |
| 2003/0105555 A1 | 6/2003 | Lunak et al. ................. 700/237 |
| 2003/0120745 A1 | 6/2003 | Katagishi et al. |
| 2003/0195818 A1 | 10/2003 | Howell et al. |
| 2003/0220885 A1 | 11/2003 | Lucarelli et al. |
| 2004/0088231 A1 | 5/2004 | Davis, Jr. ....................... 705/28 |
| 2004/0098350 A1 | 5/2004 | Labrou et al. |
| 2004/0122735 A1 | 6/2004 | Meshkin |

(56) References Cited

U.S. PATENT DOCUMENTS

| | | |
|---|---|---|
| 2004/0171381 A1 | 9/2004 | Inselberg |
| 2005/0289061 A1 | 12/2005 | Kulakowski et al. |
| 2006/0077062 A1* | 4/2006 | Andrechak ............ G06K 19/04 340/572.8 |
| 2006/0190384 A1 | 8/2006 | Gurley et al. |

FOREIGN PATENT DOCUMENTS

| | | |
|---|---|---|
| WO | 200101706 | 1/2001 |
| WO | 200157807 | 8/2001 |
| WO | 200172107 | 10/2001 |
| WO | 200184268 | 11/2001 |

OTHER PUBLICATIONS

U.S. Patent and Trademark Office; Non-Final Rejection; U.S. Appl. No. 10/694,311, dated Oct. 29, 2007.
U.S. Patent and Trademark Office; Response to Non-Final Rejection; U.S. Appl. No. 10/694,311, dated Jan. 29, 2008.
U.S. Patent and Trademark Office; Final Rejection; U.S. Appl. No. 10/694,311, dated Apr. 2, 2008.
U.S. Patent and Trademark Office; Appeal Brief; U.S. Appl. No. 10/694,311, dated Nov. 3, 2008.
U.S. Patent and Trademark Office; Examiner's Answer; U.S. Appl. No. 10/694,311, dated Mar. 13, 2009.
U.S. Patent and Trademark Office; Reply to Examiner's Answer; U.S. Appl. No. 10/694,311, dated May 13, 2009.
U.S. Patent and Trademark Office; Decision on Appeal; U.S. Appl. No. 10/694,311, dated Oct. 27, 2011.
U.S. Patent and Trademark Office; Request to Reopen Prosecution; U.S. Appl. No. 10/694,311, dated Dec. 27, 2011.
Horngren, Charles T. et al.; Introduction to Financial Accounting, Revised 3rd Ed., Prentice-Hall, Inc., 1988.
Borland Paradox for Windows User's Guide, Borland International, Inc., 1994.
Riley, David D., Data Abstraction and Structure, An Introduction to Computer Science II, Boyd and Fraser Publishing Company, 1987.
White, Ron; How Computers Work, Millennium Ed. Que Corporation, Sep. 1999.
Derfler, Frank J., et al; How Networks Work, Millennium Ed., Que Corporation, Jan. 2000.
Gralla, Preston, How the Internet Works, Millennium Ed., Que Corporation, Aug. 1999.
Roussos, et al.; A Case Study in Pervasive Retail; WMC, Sep. 28, 2002.

\* cited by examiner

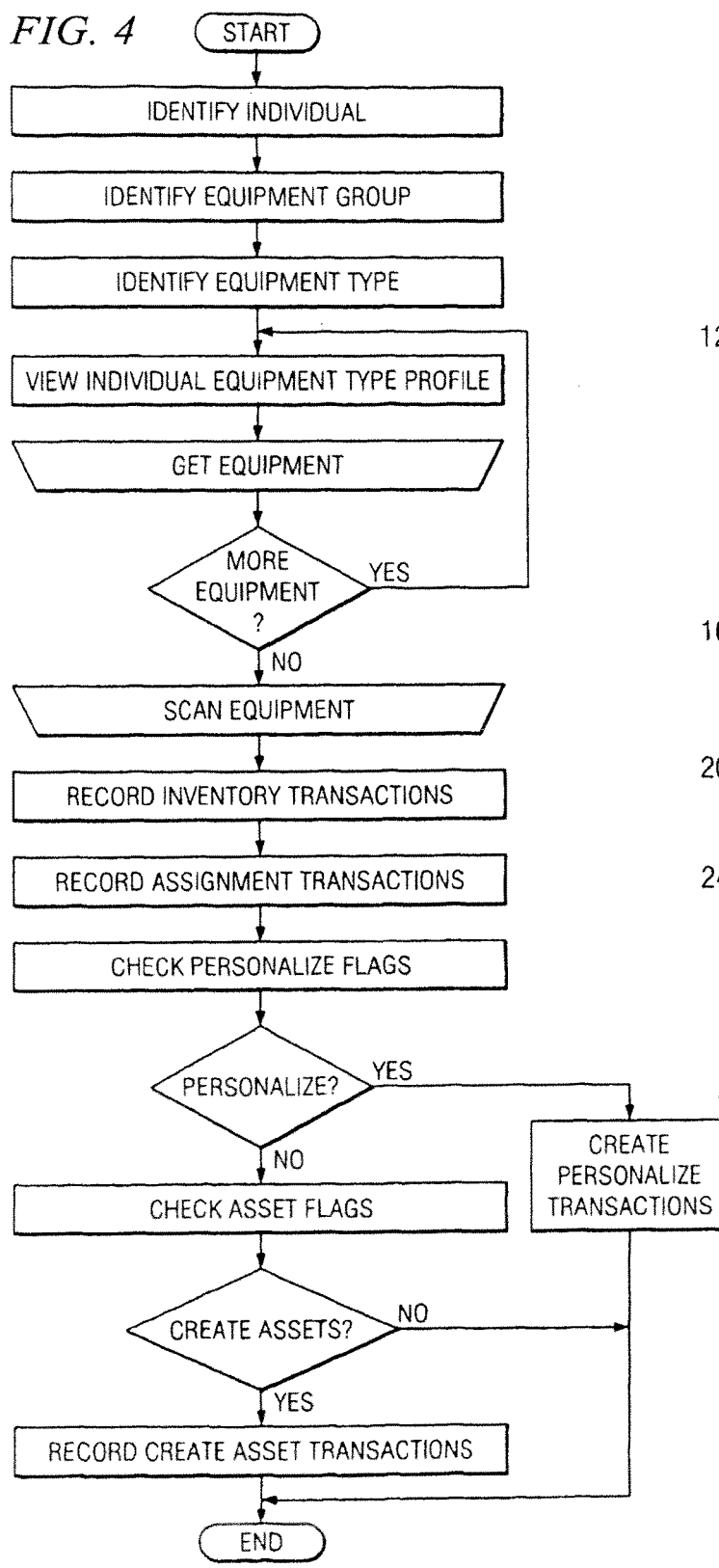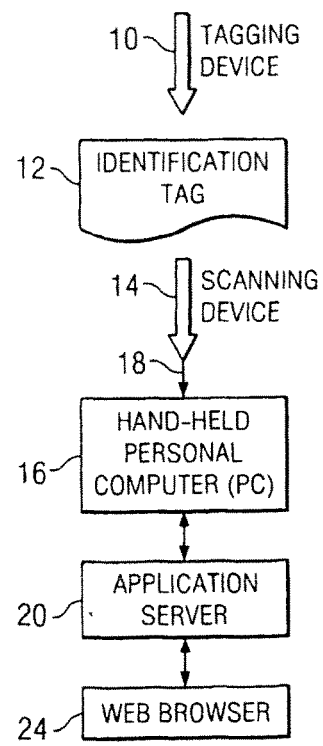

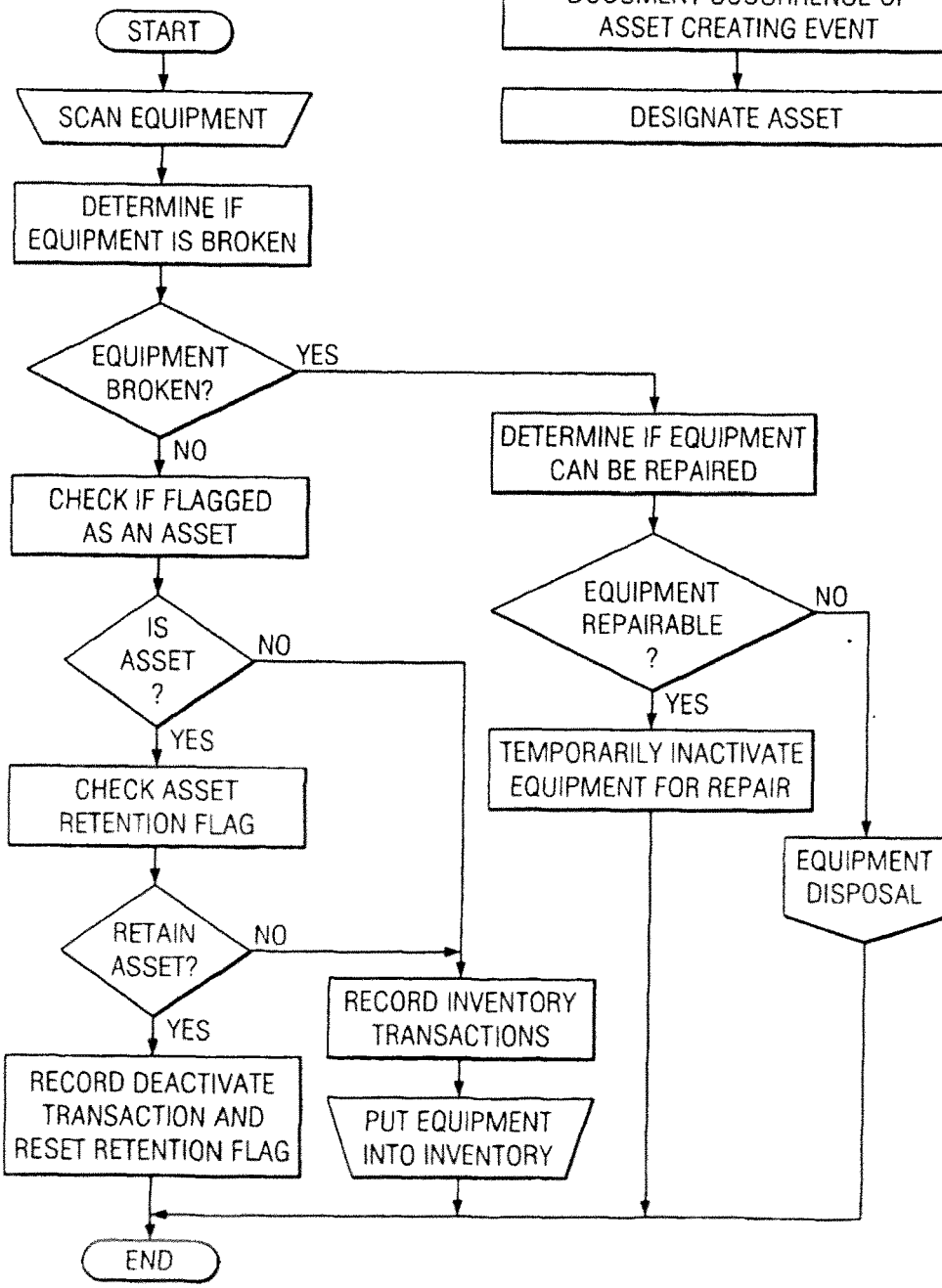

EQUIPMENT MANAGEMENT SYSTEM

CROSS-REFERENCE TO RELATED APPLICATIONS

This application is a continuation application of U.S. patent application Ser. No. 12/950,585, filed on Nov. 19, 2010, now U.S. Pat. No. 8,370,225, which is a continuation application of U.S. patent application Ser. No. 11/086,943, filed on Mar. 22, 2005, now U.S. Pat. No. 7,840,453, issued Nov. 23, 2010, entitled "EQUIPMENT MANAGEMENT SYSTEM," which is a continuation application of U.S. Ser. No. 10/038,292, filed Jan. 4, 2002 entitled "EQUIPMENT MANAGEMENT SYSTEM," now abandoned, each of which are hereby incorporated by reference for all purposes. This application is also related to U.S. Pat. No. 8,234,185, issued Jul. 31, 2012, entitled "SYSTEM AND METHOD FOR TRACKING AUTHENTICATED ITEMS," and pending U.S. Continuation patent application Ser. No. 13/556,002, filed Jul. 23, 2012, entitled "SYSTEM AND METHOD FOR TRACKING AUTHENTICATED ITEMS."

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

The present invention relates to a system for the management of equipment, and particularly to the management of sports equipment. The invention identifies inventory, tracks inventory during the conversion from its status from inventory to valued asset, and provides a provenance for items of sports memorabilia.

Tracing its origins to the trading cards children would collect and trade of their favorite professional athletes, the sports memorabilia market is now a huge industry. Sports enthusiasts will pay large sums of money for items associated with their favorite teams and players. A visit to any professional sporting venue reveals stores selling replica jerseys. Labels sewn into the jerseys stating "Official" or "Authentic" are intended to convince the purchaser that the item is identical to the one worn by their favorite player. Even more valuable to a collector is an item actually worn or used in a game. Collectors today will pay much more for a jersey or other piece of equipment used in a game.

As in the antique industry, with sports memorabilia, the history of an item is important when calculating value. For example, a civil war era pistol is a valuable item to a collector. A civil war era pistol owned by U.S. Grant or Robert E. Lee would be worth considerably more. An item separate from such a pistol that establishes a history of ownership is called provenance. In the sports memorabilia industry provenance can enhance the value of an item. For example, if a player sets a record in a game, the jersey he wears while breaking that record will be valuable. After the game, some person must take possession of the jersey and deliver it to a prospective buyer with some assurance that the jersey is the one worn in the game. Because of the potential money at stake, there is incentive for dishonesty.

One of the main concerns for this industry is authenticity. A common method of authentication is to have the athlete sign an item for sale. According to information on the Federal Bureau of Investigation (FBI) website more than fifty percent of autographed memorabilia may be forged. The forged items are often provided with forged certificates of authenticity and photographs of the athlete signing a similar item. Unfortunately, unless the collector receives the item directly from the athlete there is often no way of being sure of authenticity.

A professional sports team is operated as a business. Identifying and exploiting new revenue sources is critical to success. It is also important to minimize expenses.

There is a need for a system which can account for every piece of equipment owned by a team and the use of that equipment. U.S. Pat. No. 6,195,006 (herein incorporated by reference) to Bowers et al. discloses an inventory system using RFID tags. This system can account for every piece of inventory and provide circulation status. U.S. Pat. No. 5,796,351 (herein incorporated by reference) to Yabuki discloses a system for providing information about exhibition objects. These systems could be adapted for use with the equipment used by a sports team but neither of these systems would be able to identify a piece of sports memorabilia and provide a record of its use in a game. There is a need for a system which can identify a piece of equipment used in a game which can subsequently be sold as a piece of sports memorabilia. There is a further need for a system which can provide the provenance of an item of sports memorabilia. The provenance provides a history of the item as well as authentication. This invention fills these needs.

BRIEF SUMMARY OF THE INVENTION

The invention is a system and method of managing equipment. The invention identifies inventory, tracks inventory outflows and inflows, and manages inventory during the conversion from its status from inventory to valued asset to establish the provenance of the piece of equipment. The system incorporates a tagging device to attach identification tags to each piece of equipment. A reading device such as a scanner, is used to read the identification tags and this information is ultimately relayed to an equipment server. An input device (which could be the reading device) is used to input information to the equipment server. The equipment server runs the equipment management program.

In use, the system first receives equipment into inventory. The equipment is then identified by group and type. Equipment groups are user defined labels (e.g. game jerseys, boxing gloves, shorts). Equipment types have any number of fixed (e.g. catalog item number) and optional properties (e.g. size). The collection of all of the equipment is the inventory.

If not already present, an identification tag is affixed to each piece of equipment. Each identification tag is then scanned. The scanned value is then assigned an equipment group and equipment type. These values are sent to the equipment server and stored in an inventory database. This process is repeated for each piece of equipment.

Next the equipment is issued to an individual. Each piece of equipment is scanned, or identified as it is issued to an individual. Using the input device, the individual's profile is accessed and the piece of equipment is registered to that individual. A time and date stamp is included.

Finally, the equipment is returned. Each piece of equipment is scanned as it is returned. Using the input device, the piece of equipment is indicated as returned and whether the equipment was used in an value-enhancing event.

The equipment management program may indicate whether the piece of equipment has been transformed into a valued asset, or whether the piece of equipment should be returned to inventory to be reassigned later.

BRIEF DESCRIPTION OF THE SEVERAL VIEWS OF THE DRAWINGS

The accompanying drawings, which are incorporated in and form a part of the specification, illustrate the embodiments of the present invention and together with the description, serve to explain the principles of the invention. In the drawings:

FIG. 2 is a diagram of the application server;
FIG. 4 is a flowchart of the equipment issue step;
FIG. 5 is a flowchart of the equipment return step;
and
FIG. 6 is a flowchart of the improved method of equipment management.

DETAILED DESCRIPTION OF THE INVENTION

Figure 1:
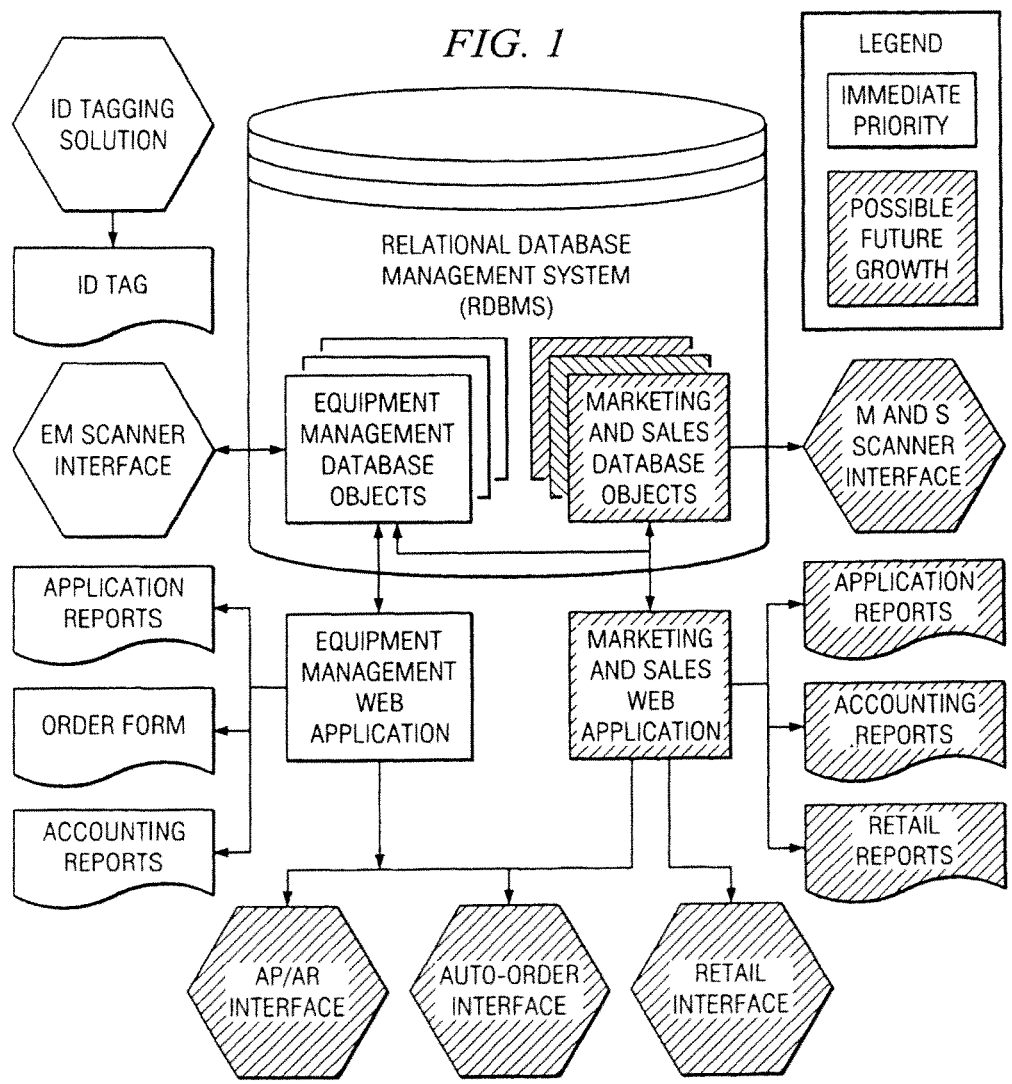
FIG. 1 is a diagram of the system architecture.

The physical components of the system can be seen in FIG. 1. A tagging device 10 is used to attach an identification tag 12 to a piece of equipment. The identification tag 12 can be any portable unique identifier. In the preferred embodiment, identification tag 12 is a barcode. However, it should be understood that any suitable identifier may be used, so long as the piece of equipment is uniquely identified. Thus, the unique identification tag 12 may take the form of a radio frequency (RF) tag, a magnetic strip tag, an electronically operated tag, or a biological tag.

Scanning device 14 is used to read the identification tag 12. The scanning device 14 can be any type of scanning device, but in the preferred embodiment the scanning device 14 is a barcode reader. The invention will also work with a bulk type scanner capable of scanning many pieces of equipment simultaneously.

The scanning device 14 is in communication with a handheld personal computer (PC) 16. The PC 16 is connected to the scanning device 14 by any acceptable means, but in the preferred embodiment a radio frequency switch 18 is used. The scanning device 14 can also be connected by a hard-wired attachment such as a serial cable or USB cable, or by a wireless device such as by infrared communication. The scanning device 14 can also be integrated directly into the PC 16.

In the preferred embodiment, the PC 16 is connected to an application server 20 by a hard-wired (serial or USB cable) attachment through a cradle 22. Any other suitable attachment means can be used including RF and IR connections. The application server 20 interacts with a web browser 24 allowing remote access.

The scanning device 14 and the PC 16 can be operated using any suitable operating system, but in the preferred embodiment MICROSOFT WINDOWS CE is used. The application server and web browser can use any suitable program but in the preferred embodiment MICROSOFT WINDOWS NT AND INTERNET EXPLORER are used, respectively. The equipment management program runs on the application server 20 and can be any inventory management program capable of being customized.

The equipment management program is used to organize and store information. Information is stored in equipment management databases. The information in the databases is used by an application server to generate different reports.

The program stores information in two types of databases. The first database is the equipment database. The second database is the individual database. The equipment database stores information for each piece of equipment. The first component of information is an identification code. This information corresponds to the portable unique identifier located on the piece of equipment. The next component is an asset flag that can be turned on and off. A status component is either activated or deactivated. Equipment group is a user-defined label. For example an equipment group can be designated "Practice Jersey", "Indoor Shoes", "Boxing Gloves", "Helmet", "Home Game Jersey", "Soccer Shorts", "Baseball Bat", etc. Equipment type consists of any number of fixed and optional properties. Fixed properties can be information such as the catalog number. Optional properties include items such as size or sleeve length. Also included in the equipment database is assignment information.

The individual database has information on each individual in the system. This information includes identification of the individual, asset creation status, equipment preferences, and equipment assignments.

Figure 3:
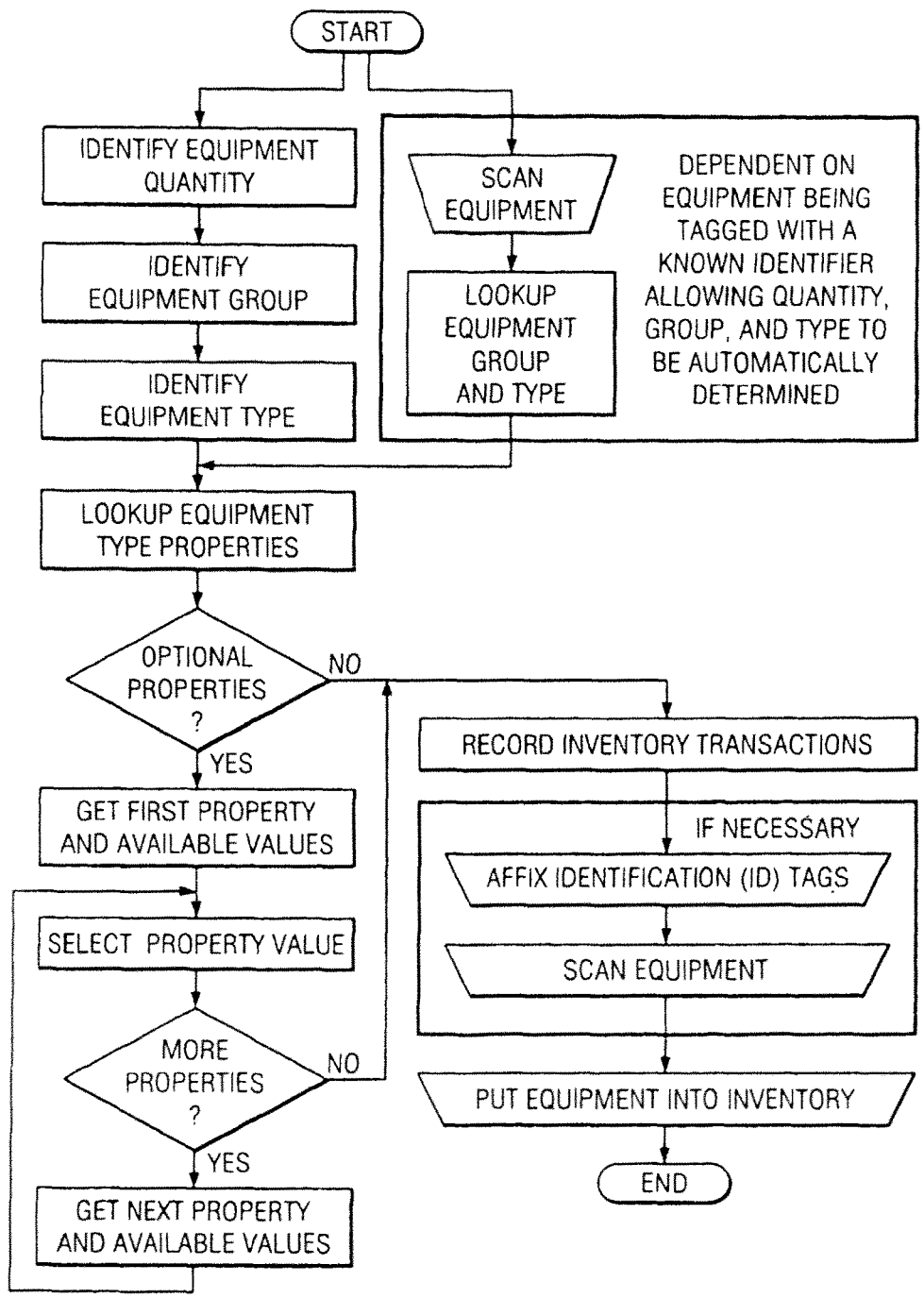
FIG. 3 is a flowchart of the equipment reception step.

The system is used to manage equipment and identify assets. Referring to FIG. 3, it can be seen how the system is used. To start using the system, every current piece of equipment and every incoming piece of equipment must be examined for a portable unique identifier tag 12. It should be noted that the term "tag" does not require a certain geometrical shape, and specifically, does not require a rectangular shape After affixing a portable unique identifier tag 12 to the equipment where missing, the information on the equipment and unique identifier tag 12 is entered into the system. This is done by reading the portable unique identifier tag 12 with the scanning device 14. The equipment group, equipment type and any optional properties are then associated with the piece of equipment. This is repeated until each piece of all equipment with unique identifier tag 12 is entered into the system's first database.

The next step is to issue the equipment. This process is shown in FIG. 4. After identifying the individual who is receiving equipment, the system calls up that individual's equipment profile. This is a list of all the equipment which needs to be assigned to that individual. An individual can have several equipment profiles depending upon the scheduled activity. For example, the individual can have a practice profile and a game profile. After all of the proper equipment is selected after consulting the individual's profile, the selected equipment is scanned, the equipment status associated with each piece of equipment is changed to assigned, and the equipment is handed over to the individual. Finally, a time and date stamp is associated with the transaction. This updates the equipment profile in the equipment database and updates information on the individual's profile in the individual profile database. In the equipment profile database, the individual's name is associated with each piece of equipment handed out. In the individual profile database, the piece of equipment is associated with an "assigned equipment" list.

The return of equipment is similar to the issue equipment process. This process is shown in FIG. 5. Equipment is returned by the individual, and the identification tags 12 associated with the equipment is scanned. The equipment is physically inspected to determine whether it is broken. If broken, a determination is made to see whether the equipment can be repaired. If repairable, the equipment is inactivated. If not repairable, the equipment is sent to equipment disposal. If the equipment is not broken, the equipment is checked to see if it is an asset. No equipment can become an asset until after an asset-creating event has occurred and has been documented by the system. An asset-creating event can be any event, but in the preferred embodiment, an asset-creating event is a game. If not an asset, the equipment profile database and individual profile database are updated. If it is an asset, a check is made to see if the asset should be retained. If the asset is to be retained the equipment is deactivated and set aside for disposal. If the asset is not to be retained, equipment and individual profiles are updated. The usage of the equipment is then recorded in the system. An example of this would be to indicate the piece of equipment was used in a game.

The equipment program uses a two-step process to designate a piece of equipment an asset. Using the input device the asset flag can be turned on for an equipment group. Indeed, with the desire by collectors and sports fans to possess "authentic" jerseys or equipment, even equipment that is unassigned in inventory can become valuable. All equipment in that group then becomes a potential asset. The next step is to set the asset status in the individual profiles. The default setting in all individual profiles turns the asset flag off when a piece of equipment is assigned to that individual. For a specifically identified individuals, the default setting is reversed and the asset flag stays turned on when the equipment is assigned to that individual. Generally, only the team stars would have this asset setting.

The equipment management program creates a history file for each piece of equipment. The history file includes information relating to the assignment and use of the piece of equipment. Such history information may include, but is not limited to, the name of the individual using the equipment, the dates and times of use, the opposing team or opposing player, various records achieved or broken during the use of the equipment, etc. This information is stored in the equipment application server and can be accessed via the Internet using a web browser. Accordingly, a person selling an asset as an article of sports memorabilia may access the history file and demonstrate authenticity as well as the provenance of the item.

The equipment management program also has an order form generation feature. When a piece of equipment is deactivated and disposed of (i.e. broken or sold as an asset) the program may automatically generate a complete order form, or may electronically place an order for replacement equipment using the equipment profile.

The equipment management program also has a post activity update feature. For example, a future Hall of Fame athlete can create a market demand for game-worn equipment. A report is generated detailing every piece of equipment ever assigned to the individual. The results are then filtered by equipment group. The desired results are then deactivated and designated for disposal.

The equipment management system of the present invention provides accountability for every piece of equipment. It should be noted that the invention is drawn to an improved method of using a known system to manage equipment. The above described system is indicative of the type of system the invention is intended to work with, but should not be construed as the only type of system the method works with. The invention is intended to function with any type of equipment management system. The improvement involves the ability to identify or flag a piece of equipment assigned to an asset-creating individual. In the preferred embodiment, an asset-creating individual for a sports team is identified as any player that can create a market for game-used equipment. In most cases this would be a fan favorite player. It is specifically pointed out that the system may also function with athletes participating in non-team, individual sports, such as boxing, tennis, swimming, track and field, etc. A potential asset is defined as any piece of equipment which becomes valuable when used in an asset creating event. In the preferred embodiment potential assets are items like game jerseys, shoes, helmets, boxing gloves, shorts, baseball bats, baseball gloves, shirts, hats, etc.

The improvement is shown in the flowchart of FIG. 6. The invention identifies items meeting the following three criteria: 1) potential assets, 2) assigned to asset creating individuals, 3) used in an asset-creating event. The preferred embodiment above uses a flag to identify an asset. The flag is turned on for all members of an equipment group. The flag is then turned off if the equipment is assigned to a non asset creating individual, but left on when assigned to an asset creating individual. After an asset-creating event has taken place, the system designates an asset for any flagged piece of equipment. It should be noted that any number of other methods could be used to designate an asset, and the invention is intended to encompass those variants. For example the system could flag all equipment assigned to an asset-creating individual and turn the flag off for any piece of equipment not in a designated equipment group. The invention is intended to cover a method of assigning a flag to a piece of equipment designated a potential asset and assigned to an asset-creating individual.

In view of the foregoing, it will be seen that the several advantages of the invention are achieved and attained. The preferred embodiment and alternatives were chosen and described in order to best explain the principles of the invention and its practical application to thereby enable others skilled in the art to best utilize the invention in various embodiments and with various modifications as are suited to the particular use contemplated. As various modifications could be made in the constructions and methods herein described and illustrated without departing from the scope of the invention, it is intended that all matter contained in the foregoing description or shown in the accompanying drawings shall be interpreted as illustrative rather than limiting. For example, the system and method could be used on the set of a movie or on a political campaign. Thus, the breadth and scope of the present invention should not be limited by any of the above-described exemplary embodiments, but should be defined only in accordance with the following claims appended hereto and their equivalents.

What is claimed is:

1. A method for monitoring items, the method comprising:
accessing a list containing a plurality of wireless tag identifiers;
sending, for each of the wireless tag identifiers in the list, a query via the antenna to the wireless tag corresponding to the wireless tag identification;
verifying that an item corresponding to the wireless tag is present in an area for each of the plurality of wireless tag identifiers when a response is received via the antenna from the wireless tag corresponding to the wireless tag identification;
associating each of the items with a a personal identifier associated with an individual and an event;
verifying that each of the plurality of individuals are present in the area;
determining one or more additional items to be checked out to each of the individuals as a function of the individual;
changing a status indicator associated with the items to show that the items have been checked out to the individual; and storing data identifying the individual and the event the item is used.

2. The method of claim 1, wherein each query is sent via the antenna to the corresponding wireless tag via a wireless link between the antenna and the wireless tag.

3. The method of claim 1, further comprising:
receiving one of the items after it has been checked out to the individual;
determining whether the item corresponding to the wireless tag has been checked out to the individual; and
checking the item back in by changing a status of the item.

4. The method of claim 1, wherein in the accessing step, the list is accessed from a memory device and further comprising storing data that identifies an event at which the items have been used.

5. The method of claim 4, wherein the list that is accessed from a memory device is a prior list that was generated during a prior monitoring operation prior to a start of a predetermined event, wherein data identifying the predetermined event is stored in the memory device.

6. The method of claim 1, wherein the query sent to the wireless tag contains the wireless tag identification that corresponds to the wireless tag.

7. The method of claim 1, wherein the list further contains a status indicator corresponding to each of the at least one wireless tag identifier, the status indicator providing an indication of whether the item associated with the wireless tag that corresponds to the wireless tag identification has been used in an event.

8. The method of claim 1 further comprising:
receiving the items from the individuals after they have been used by the individuals in a single event; and
changing a status indicator associated with the items to show that the items have been checked in from the individuals.

9. The method of claim 8, wherein the unique identification code is a value of the wireless tag identification that corresponds to the wireless tag.

10. The method of claim 1, further comprising the steps of:
performing a scan operation to determine a presence of a new wireless tag that does not have a corresponding wireless tag identification in the inventory list; and
updating the inventory list to include a new wireless tag determined to be present during the scan operation.

11. A monitoring system for monitoring items, each of which has a corresponding wireless tag with a corresponding wireless tag identifier, comprising:
an antenna operable to receive and transmit signals within an area; and
a processor configured to:
access a list containing a plurality of wireless tag identifiers;
send a query via the antenna to the wireless tags corresponding to the wireless tag identifiers;
verify that the items corresponding to the wireless tags are present in the area when a response is received via the antenna from the wireless tag corresponding to the wireless tag identification;
verify that a plurality of individuals, each associated with one or more item, are present in the area;
associate each of the items with a personal identifier associated with one of the individuals and an event; and
storing data identifying the individual and the event the item is used.

12. The monitoring system of claim 11, wherein each query is sent via the antenna to the corresponding wireless tag via a wireless link between the antenna and the wireless tag.

13. The monitoring system of claim 11, wherein each wireless tag is an active RFID tag.

14. The monitoring system of claim 11, further comprising a memory device that is operationally coupled to the processor, wherein in the accessing step the list is accessed from the memory device.

15. The monitoring system of claim 14, wherein the list that is accessed from the memory device is a prior list that was generated during a prior monitoring operation.

16. The monitoring system of claim 11, wherein the query sent to the wireless tag is based on the wireless tag identification that corresponds to the wireless tag.

17. The monitoring system of claim 11, wherein the list further contains a first status indicator and a second status indicator corresponding to each of the at least one wireless tag identification, the first status indicator providing an indication of whether the wireless tag that corresponds to the wireless tag identification is associated with an individual and the second status indicator providing an indication of whether the wireless tag that corresponds to the wireless tag identification has been checked out for use during an event.

18. The monitoring system of claim 11, wherein the query sent to the wireless tag is based on a unique identification code that corresponds to the wireless tag.

19. The monitoring system of claim 18, wherein the unique identification code is a value of the wireless tag identification that corresponds to the wireless tag.

20. The monitoring system of claim 11, wherein the processor is further configured to:
perform a scan operation to determine a presence of a new wireless tag that does not have a corresponding wireless tag identification in the list; and
update the list to include a new wireless tag determined to be present during the scan operation and a status indicator that identifies whether a product associated with the new wireless tag has been used in an asset-creating event.

\* \* \* \* \*